US012595000B2

(12) United States Patent
    Swamygowda et al.

(10) Patent No.: US 12,595,000 B2
(45) Date of Patent: Apr. 7, 2026

(54) REINFORCEMENT MEMBER FOR A ROOF STRUCTURE OF A VEHICLE

(71) Applicant: L&T TECHNOLOGY SERVICES LIMITED, Chennai (IN)

(72) Inventors: Lokesha Hulikal Swamygowda, Bengaluru urban (IN); Sivakumar Jothimani, Virudhunagar (IN); Ravi Kumar Karkal Jayaram, Bengaluru (IN)

(73) Assignee: L&T TECHNOLOGY SERVICES LIMITED, Chennai (IN)

( * ) Notice: Subject to any disclaimer, the term of this patent is extended or adjusted under 35 U.S.C. 154(b) by 371 days.

(21) Appl. No.: 18/206,633

(22) Filed: Jun. 7, 2023

(65) Prior Publication Data

US 2024/0158016 A1 May 16, 2024

(30) Foreign Application Priority Data

Nov. 14, 2022 (IN) .............................. 202241065140

(51) Int. Cl.
    *B62D 25/06* (2006.01)
(52) U.S. Cl.
    CPC .................................. *B62D 25/06* (2013.01)
(58) Field of Classification Search
    CPC ......... B62D 25/06; B62D 27/02; B62D 27/03

USPC ............................................. 296/210, 29, 30
See application file for complete search history.

(56) References Cited

U.S. PATENT DOCUMENTS 9,193,246 B2 * 11/2015 Wood ..................... B60H 1/245

FOREIGN PATENT DOCUMENTS

CN      207225297 U  *  4/2018
JP      2002038664 A  *  2/2002   .......... E04D 13/031
JP      6845878 B2  *  3/2021   ............. B62D 27/02

OTHER PUBLICATIONS

CN207225297 Text (Year: 2018).*
JP2002038664 Text (Year: 2002).*
JP6845878 Text (Year: 2021).*

* cited by examiner

*Primary Examiner* — Dennis H Pedder
(74) *Attorney, Agent, or Firm* — Kendal M. Sheets

(57) ABSTRACT

Present disclosure related to a reinforcement member for a roof structure of a vehicle. The reinforcement member includes a first portion extending along a longitudinal axis of the vehicle. The first portion is defined with at least one protuberance. Further, a second portion is angularly connected to the first portion and extending in a substantially perpendicular direction to the first portion, wherein the second portion is defined with one or more indentation.

7 Claims, 3 Drawing Sheets

REINFORCEMENT MEMBER FOR A ROOF STRUCTURE OF A VEHICLE

TECHNICAL FIELD

The present disclosure generally relates to the field automobiles. Particularly but not exclusively the present disclosure relates to reinforcement member for a roof structure of the automobile.

BACKGROUND

Typically, automobiles are provided with roof structures having a pair of left and right roof side rails extending in a front-rear direction on both side edges, left and right, of a roof panel. To strengthen roof structures to meet the evolving safety norms, there are a number of alternatives that are commonly used. The most common practice to strengthen the roof structure is to provide roof reinforcements in form of roof reinforcement member at critical regions on the roof panel. The roof reinforcement member is provided across the roof side rails, in a vehicle width direction, along the underside of the roof panel. From the viewpoint of, for instance, workability during the roofing operation, the roof reinforcement member is ordinarily shorter than the distance between the left and right roof side rails. The roof reinforcement member is connected to the roof side rails via known joining process at the ends of the roof reinforcement member.

The said roof reinforcement members are generally stored in storage unit/warehouse of a manufacturing unit and are then supplied to the manufacturing line based on requirement. Generally, the reinforcement members are stacked one over another and the stack of reinforcement members are then carried to the manufacturing line. Conventional reinforcement members are generally manufactured to conform to the shape of the roof panel [which is generally curved]. Such configuration of the reinforcement members [i.e., curved] raises a significantly big concern during stack up of the reinforcement members over one another. Also, such stacks are not easily storable in the storage boxes. The conventional reinforcement members when stacked over one another tend to form rainbow/curved profile as evident from FIG. 4. Also, the conventional configuration of the reinforcement members slide over each other, thus making it difficult to handle. These disadvantages have an even greater challenge during transportation and storage of the conventional reinforcement members.

The present disclosure is directed to overcome one or more limitations stated above or any other limitations associated with the prior art. The information disclosed in this background of the disclosure section is only for enhancement of understanding of the general background of the invention and should not be taken as an acknowledgement or any form of suggestion that this information forms the prior art already known to a person skilled in the art.

SUMMARY OF THE INVENTION

One or more shortcomings of existing reinforcement member for a roof structure have been overcome, and additional advantages are provided through the system as claimed in the present disclosure. Additional features and advantages are realized through the techniques of the present disclosure. Other embodiments and aspects of the disclosure are described in detail herein and are considered a part of the claimed disclosure.

The limitations of the prior arts are addressed to a great extent by the reinforcement member for the roof structure of the vehicle as disclosed in the present disclosure. The reinforcement member for the roof structure of the vehicle includes a first portion extending along a longitudinal axis of the vehicle. The said first portion is defined with at least one protuberance. Further, a second portion is angularly connected to the first portion and is extending in a substantially perpendicular direction to the first portion. The second portion is defined with one or more indentations on an end opposite to the end of the second portion.

In an embodiment of the present disclosure, the first portion and the second portion are integrally formed as a substantially L-shaped member. The at least one protuberance is defined at a substantially central portion of the first portion. The at least one protuberance is defined proximal to a periphery of the first portion. The first portion is defined with a stepped section. The stepped section is defined along an entire length of the first portion. Further, a part of the second portion is defined with a stepped section. Furthermore, profile of the protuberance is hat-shaped.

In another non-limiting embodiment, a front reinforcement member for a roof structure of a vehicle is discussed. The front reinforcement member includes a first portion extending along a longitudinal axis of the vehicle. The said first portion is defined with at least one protuberance. Further, a second portion is angularly connected to the first portion and is extending in a substantially perpendicular direction to the first portion. The first portion is defined with a stepped section along an entire length of the first portion. The second portion is defined with one or more indentations on an end opposite to the end of the second portion. In yet another non-limiting embodiment, a rear reinforcement member for a roof structure of a vehicle is described. The rear roof reinforcement member includes a first portion extending along a longitudinal axis of the vehicle and is defined with at least one protuberance. The first portion is defined with a stepped section along an entire length of the first portion. A second portion is angularly connected to the first portion and is extending in a substantially perpendicular direction to the first portion. The second portion is defined with one or more indentations on an end opposite to the end of the second portion. The said first portion and the second portion is defined with a stepped section, the stepped section is defined along an entire length of the first portion and a part of the second portion. The first portion is further defined with a joggled section. The joggled section is defined proximal to an end of the first portion. The joggled section is substantially perpendicular to the longitudinal axis.

It is to be understood that the aspects and embodiments of the disclosure described above may be used in any combination with each other. Several of the aspects and embodiments may be combined to form a further embodiment of the disclosure. The foregoing summary is illustrative only and is not intended to be in any way limiting. In addition to the illustrative aspects and features described above, further aspects and features will become apparent by reference to the drawings and the following detailed description.

BRIEF DESCRIPTION OF ACCOMPANYING DRAWINGS

The novel features and characteristic of the disclosure are set forth in the appended claims. The disclosure itself, however, as well as a mode of use, further objectives and advantages thereof, will best be understood by reference to the following detailed description of an embodiment when read in conjunction with reference to the accompanying drawings wherein like reference numerals represent like elements and in which:

Figure 1:
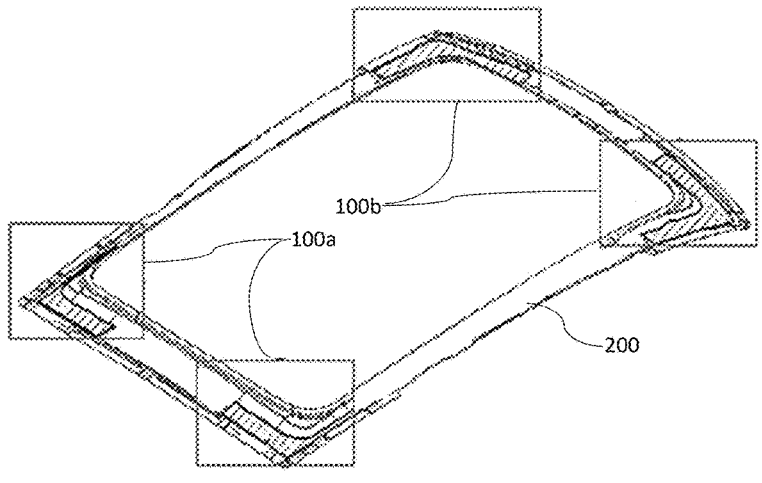
FIG. 1 illustrates a schematic perspective view of a roof structure depicting reinforcement members provided at critical regions, in accordance with an embodiment of the present disclosure.

The figures depict embodiments of the disclosure for purposes of illustration only. One skilled in the art will readily recognize from the following description that alternative embodiments of the system illustrated herein may be employed without departing from the objective of the disclosure described herein.

DETAILED DESCRIPTION OF THE DRAWINGS

The foregoing has broadly outlined the features and technical advantages of the present disclosure in order that the detailed description of the disclosure that follows may be better understood. Additional features and advantages of the disclosure will be described hereinafter which forms the subject of the claims of the disclosure. It should be appreciated by those skilled in the art that, the conception and specific embodiments disclosed may be readily utilized as a basis for modifying other devices, systems, assemblies, and mechanisms for carrying out the same purposes of the present disclosure. It should also be realized by those skilled in the art that, such equivalent constructions do not depart from the scope of the disclosure as set forth in the appended claims. The novel features which are believed to be characteristics of the disclosure, to its system, together with further objects and advantages will be better understood from the following description when considered in connection with the accompanying figures. It is to be expressly understood, however, that each of the figures is provided for the purpose of illustration and description only and is not intended as a definition of the limits of the present disclosure.

In accordance with various embodiments of the present disclosure relates to a reinforcement member for a roof structure of a vehicle. The reinforcement member includes a first portion and a second portion. The first portion and the second portion are integrally formed as a substantially L-shaped member. The first portion may extend along a longitudinal axis of the vehicle. The first portion may extend along a longitudinal axis of the vehicle and may be defined with at least one protuberance. The at least one protuberance is defined at a substantially central portion of the first portion and the at least one protuberance is defined proximal to a periphery of the first portion. In an embodiment, the first portion is defined with a stepped section and is defined along an entire length of the first portion. Further, the reinforcement member includes a second portion which may extend angularly from the first portion and is extending in a substantially perpendicular direction to the first portion. The second portion is defined with one or more indentations. The reinforcement member of the present disclosure may be employed at various sections of the roof structure of the vehicle. Forthcoming embodiments elucidate the reinforcement member in detail in conjunction to FIGS. 1-3 and 5.

In an embodiment, the reinforcement member of the configuration described above restricts movement of roof panels when stacked one above another during transportation. Other myriad advantages of the reinforcement member can be realised in the course of the description presented henceforth.

While the embodiments in the disclosure are subject to various modifications and alternative forms, specific embodiments thereof have been shown by way of example in the figures and will be described below. It should be understood, however, that it is not intended to limit the disclosure to the particular forms disclosed, but on the contrary, the disclosure is to cover all modifications, equivalents, and alternative falling within the scope of the disclosure.

It is to be noted that a person skilled in the art would be motivated from the present disclosure and modify construction of the roof reinforcement for the vehicle. However, such modifications should be construed within the scope of the disclosure. Accordingly, the drawings show only those specific details that are pertinent to understand the embodiments of the present disclosure, so as not to obscure the disclosure with details that will be readily apparent to those of ordinary skill in the art having benefit of the description herein.

The terms "comprises", "comprising", or any other variations thereof used in the disclosure, are intended to cover a non-exclusive inclusion, such that a system and method that comprises a list of components does not include only those components but may include other components not expressly listed or inherent to such system, method, or assembly, or device. In other words, one or more elements in a system or device proceeded by "comprises . . . a" does not, without more constraints, preclude the existence of other elements or additional elements in the system or device.

The following paragraphs describe the present disclosure with reference to FIGS. 1-3 and 5. In the figures, the same element or elements which have similar functions are indicated by the same reference signs. With general reference to the drawings, a reinforcement member for a roof structure in accordance with the teachings of a preferred embodiment of the present disclosure is illustrated and generally identified with reference numerals 100*a* and 100*b*. In the figures, referral numeral "100*a*" depicts a front reinforcement member for a front section of the roof structure and "100*b*" depicts a rear roof reinforcement member for a rear section of the roof structure. The roof structure is depicted by referral numeral "200" in the corresponding figures. It will be understood that the teachings of the present disclosure are not limited to any particular vehicle. Further, in the corresponding drawings, the vehicle is not depicted to promote better understanding of the instant invention.

The following detailed description is merely exemplary in nature and is not intended to limit application and uses. Furthermore, there is no intention to be bound by any theory presented in the preceding background or summary or the following detailed description. It is to be understood that the disclosure may assume various alternative orientations and step sequences, except where expressly specified to the contrary. It is also to be understood that the specific devices or components illustrated in the attached drawings and described in the following specification are simply exemplary embodiments of the inventive concepts defined in the appended claims. Hence, specific dimensions or other physical characteristics relating to the embodiments that may be disclosed are not to be considered as limiting, unless the claims expressly state otherwise. Hereinafter, preferred embodiments of the present disclosure will be descried referring to the accompanying drawings. While some specific terms of "upper," "lower," "below", "above", "right", "left", "rear" or "front" and other terms containing these specific terms and directed to a specific direction will be used, the purpose of usage of these terms or words is merely to facilitate understanding of the present invention referring to the drawings. Accordingly, it should be noted that the meanings of these terms or words should not improperly limit the technical scope of the present invention.

Also, it is to be understood that the phraseology and terminology used herein is for description and should not be regarded as limiting. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings. It is to be understood that this disclosure is not limited to the specific devices, methods, applications, conditions, or parameters described and/or shown herein and that the terminology used herein is to describe particular embodiments by way of example and is not intended to be limiting of the claimed invention. Hereinafter in the following description, various embodiments will be described. For purposes of explanation, specific configurations and details are outlined to provide a thorough understanding of the embodiments. However, it will also be apparent to one skilled in the art that the embodiments may be practiced without the specific details. Furthermore, well-known features may be omitted or simplified in order not to obscure the embodiment being described.

In general, there may be disclosed an exemplary embodiment of a portion of the vehicle. The vehicle may include a plurality of wheels [not shown] for providing mobility to the vehicle. Further, the vehicle may include a vehicle frame and a body [a portion of which is depicted in FIG. 1]. The body may be secured to the vehicle frame. The vehicle includes a front end (not illustrated), a rear end (not illustrated), a right side and left side (not illustrated), defining a body structure. As would be apparent to those skilled in the art, the body structure of the vehicle may be configured to carry a power train adapted to drive the wheels through a transmission system for moving the vehicle on a surface, such as a road, in a known manner. Further, the front end of the body may have provisions to accommodate hood that may be configured to cover the engine bay. The left side and the right side may be structured to receive one or more doors which can be selectively opened or closed to access the interiors of the body. Similarly, a tailgate me be secured to the rear end of the vehicle and may be configured to cover rear compartment of the vehicle. A central portion may extend between the front-end and the rear-end of the vehicle to define a passenger compartment. Further, the central portion includes a roof structure (200) which is configured to conceal the passenger compartment and provide protection for the occupants. The said roof structure (200) as depicted in FIG. 1 is provided with the reinforcement members (100a, 100b) at critical regions. However, the regions depicted in the figures should be considered as an exemplary embodiment and should not be construed as a limitation of the present disclosure. According to the present disclosure, the reinforcement members (100a, 100b) are employed at the front sections and the rear sections of the roof structure (200). The reinforcement members (100a, 100b) may be employed at the front-corner and the rear-corner sections of the roof structure (200). The reinforcement members used along the front section of the roof structure (200) may be referred to as a front reinforcement members (100a). The reinforcement members used along the rear section of the roof structure (200) may be referred to as a rear reinforcement members (100b). The configuration of the reinforcement member (100a, 100b) will be elucidated henceforth with the aid of FIGS. 2 and 3.

Figure 2:
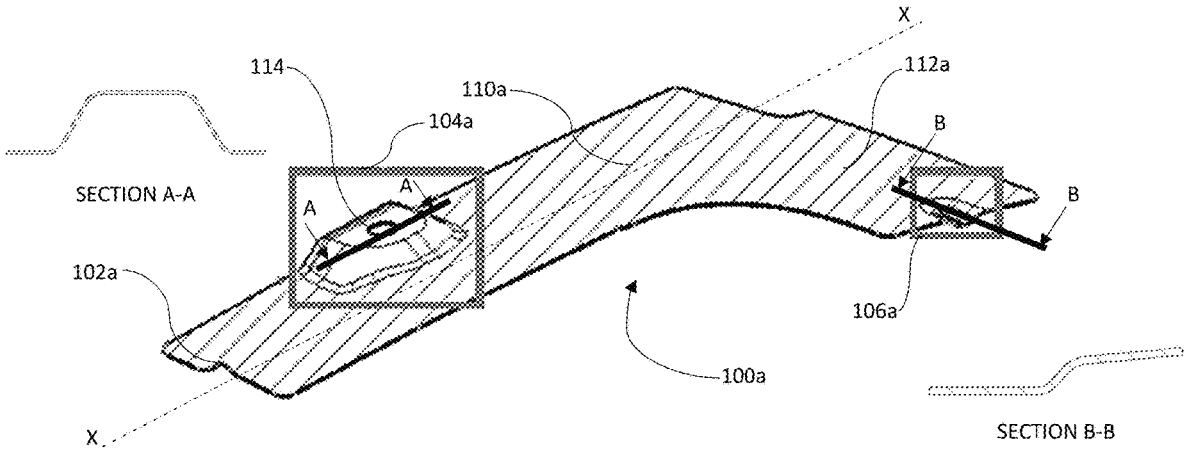
FIG. 2 illustrates a front reinforcement member for a front section of the roof structure of FIG. 1.
Figure 3:
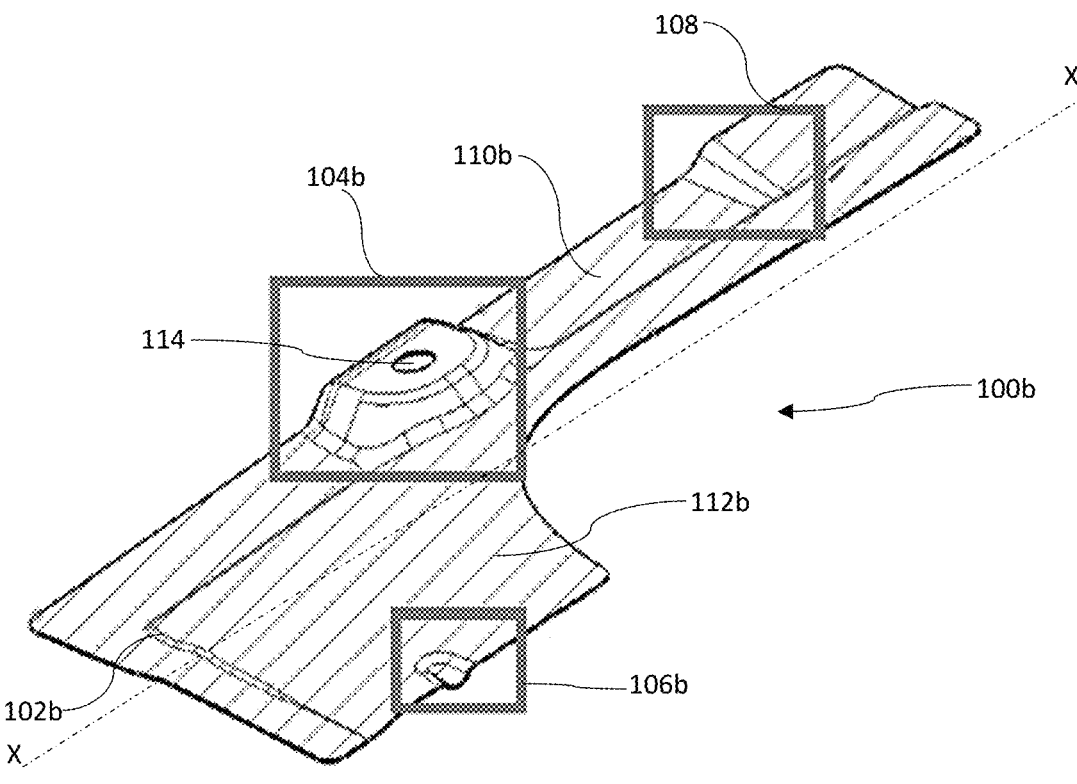
FIG. 3 illustrates a rear reinforcement member for a rear section of the roof structure of FIG. 1.

Referring to FIGS. 2 and 3 in conjunction, which illustrate the front reinforcement member (100a) and the rear reinforcement member (100b), respectively. The front reinforcement member (100a) and the rear reinforcement member (100b) are formed as a substantially L-shaped member. The front reinforcement member (100a) and the rear reinforcement member (100b) may overall have similar configuration, however some features may vary between the front and the rear reinforcement member (100a, 100b) which will be illustrated in the due course of the present disclosure.

The reinforcement member (100a and 100b) according to the present disclosure includes a first portion (110a, 110b). The first portion (110a, 110b) of the reinforcement member (100a, 100b) may extend along a longitudinal axis (X-X). Here, the longitudinal axis (X-X) is with respect to the vehicle for better understanding. The longitudinal axis (X-X) may extend along vehicle front-rear direction. The first portion (110a, 110b) of the front reinforcement member (100a) and the rear reinforcement member (100b) may extend in length along the longitudinal axis (X-X). The said first portion (110a, 110b) may be defined with at least one protuberance (104a, 104b). In an embodiment, the at least one protuberance (104a, 104b) may be defined at a substantially central portion of the first portion (110a, 110b). The said at least one protuberance (104a, 104b) may be defined close to a periphery of the first portion (110a, 110b) as apparent from the FIGS. 2 and 3. In an embodiment, the at least one protuberance (104a, 104b) may be defined away from the periphery of the first portion (110a, 110b) without deviating from the scope of the present disclosure. The said at least one protuberance (104a, 104b) may protrude perpendicularly outwardly from a major surface of the first portion (110a, 110b). In an embodiment of the present disclosure, profile of the said at least one protuberance (104a, 104b) may be hat-shaped. In some embodiments, shape of the at least one protuberance (104a, 104b) may be semi-circular and the like. The at least one protuberance (104a, 104b) may be formed into any suitable shape/profile without limiting to the shapes of the profile that are described above. In an embodiment, the at least one protuberance (104a, 104b) may be further defined with a locating hole (114) as apparent from FIGS. 2 and 3. The locating hole (114) may aid in joining of the reinforcement member (100a, 100b) to the roof structure (200) of the vehicle.

Further, the first portion (110a, 110b) may be defined with a stepped section (102a) [refer FIG. 2]. The stepped section (102a) may extend along an entire length of the first portion (110a, 110b). In addition to the said features, the rear reinforcement member (100b) may be defined with a joggled section (108) on the first portion (110b) as apparent from FIG. 3. The joggled section (108) may be defined proximal to an end of the first portion (110b) and may be oriented perpendicular to the longitudinal axis (X-X). Although, the joggled section (108) is illustrated with reference to rear reinforcement member (100b), the same may also be provided on the front reinforcement member (100a) without deviating from the scope of the present disclosure.

Further, the reinforcement member (100a, 100b) includes a second portion (112a, 112b). The second portion (112a, 112b) may be curvedly connected to the first portion (110a, 110b), that is the said second portion (112a, 112b) may be connected angularly to the first portion (110a, 110b) and may extend in a substantially perpendicular direction to the first portion (110a, 110b). The second portion (112a, 112b) may have a first end and second end. The first end of the second portion (112a, 112b) may be in juncture with the first portion (110a, 110b). Further, the second end may be defined on opposite side of the juncture of the first portion (110a, 110b) and the second portion (112a, 112b). In an embodiment, the first portion (110a, 110b) and the second portion (112a, 112b) may be formed integrally or may be joined using known joining process without deviating from the scope of the present disclosure. The second end of the second portion (112a, 112b) may be defined with one or more indentations (106a, 106b) [refer FIGS. 2 and 3]. The one or more indentations (106a, 106b) may be defined at a substantially central portion of the second end of the second portion (112a, 112b) proximal to the periphery. The term "indentation" may refer to a deep recess or notch on the edge or surface of the second portion (112a, 112b). In the rear reinforcement member (100b), a stepped section (102b) may be defined part of the second portion (112a, 112b) and an entire length of the first portion (110a, 110b) as apparent from FIG. 3 without deviating from the scope of the present disclosure. The said at least one protuberance (104a, 104b), the joggled section (108), and the one or more indentations (106a, 106b) defined on the first portion (110a, 110b) and the second portion (112a, 112b) may substantially improve the strength, stiffness and rigidity of the reinforcement member (100a, 100b). In addition to the improvements in strength, stiffness and rigidity of the reinforcement member (100a, 100b), the described features also aid in stacking of the front and rear reinforcement members (100a, 100b) vertically and restrict the movement/motion of the reinforcement member (100a, 100b) during stacking and transportations. To substantiate the same an exemplary embodiment is illustrated henceforth.

Figure 4:
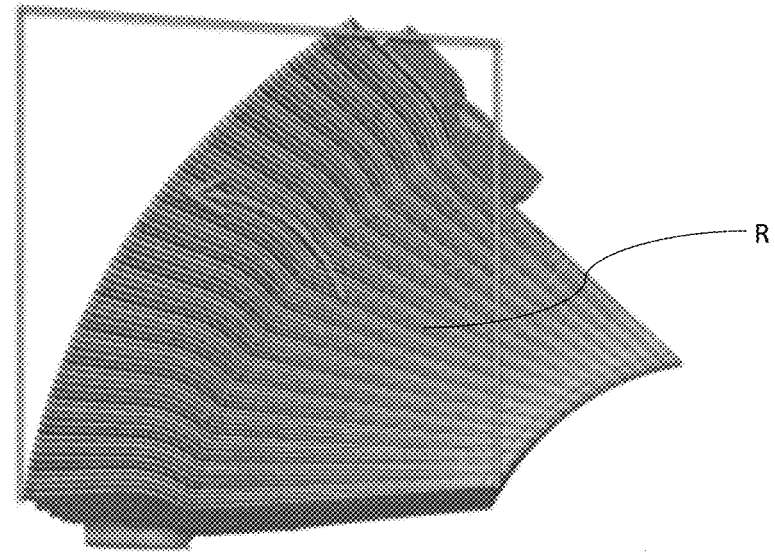
FIG. 4 illustrates an exemplary schematic view of conventional reinforcement members stacked one above another.

Generally, the reinforcement members (100a, 100b) may be stored in a storage unit in a manufacturing plant/warehouse. The said reinforcement members (100a, 100b) may have to be moved from the storage unit to a manufacturing or assembly line in the manufacturing plant. The reinforcement members (100a, 100b) may be moved in bulk from the storage unit to the assembly line. To move the reinforcement members (100a, 100b) respective members i.e., the front reinforcement member (100a) and the reinforcement member (100b) may stacked and carried to the assembly line. As the roof structure of the vehicle is generally curved at the front and rear sections, the reinforcement members are designed to conform to the shape of the roof structure. Conventionally, due to curvature of the reinforcement member vertical stack up was a big concern as it would lead to formation of rainbow stack (R) as apparent from FIG. 4. The conventional reinforcement member packaging was difficult as the stack-up clearance was higher and the reinforcement members tend to slide over each other resulting in diagonal stack-up. Also, accommodating the rainbow stack in a storage space is a challenge.

The configuration of the reinforcement member (100a, 100b) of the present disclosure as described is configured to also overcome the problems that are faced during the transportation/stack-up of the reinforcement members (100a, 100b). For instance, the front reinforcement members (100a) are stacked one above the another. When the front

Figure 5:
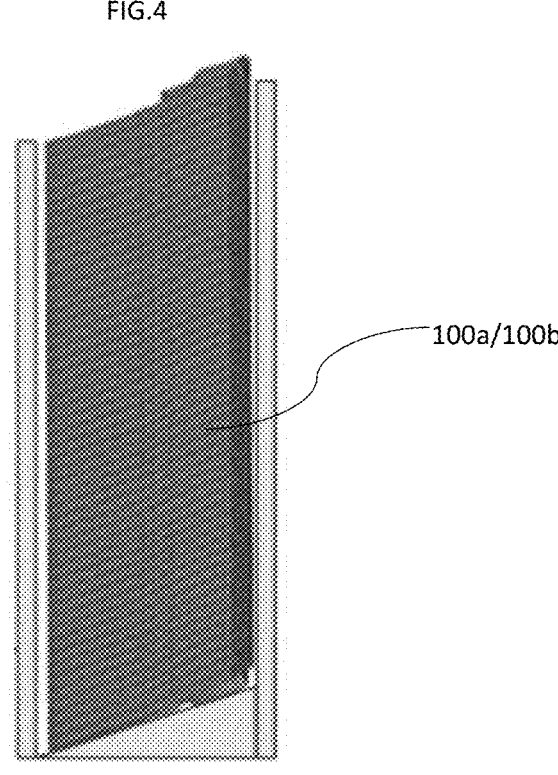
FIG. 5 illustrates an exemplary schematic view of the reinforcement member of FIG. 1 stacked one above another, in accordance with an embodiment of the present disclosure.

8 reinforcement members (100a) are stacking one on the other, the protuberance (104a) and the one or more indentations (106a) of each of the front reinforcement member (100a) overlay each other to form a substantially vertical stack as depicted in FIG. 5. Since, the at least one protuberance (104a) and the one or more indentations (106a) are overlayed, it restricts movement of the front reinforcement member (100a) stacked over each other in one or more directions. Likewise, the features on the rear reinforcement member (100b) also aid in stacking and restricting movement of the rear reinforcement member (100b) in one or more directions in stacked condition.

Advantages of the Invention

Further, the features defined on the front reinforcement members (100a) and the rear reinforcement members (100b) aid in eliminating diagonal stack up issue which was a concern with conventional reinforcement members. Also, the configuration of the reinforcement members (100a, 100b) substantially reduces stack-up clearance, therefore more parts can be stacked. The profile of the reinforcement members (100a, 100b) of the present disclosure does not affect the fitment of surrounding parts. Also, the reinforcement members (100a, 100b) may be retrofitted into existing carlines and also be employed in new car lines. Thus, making the reinforcement member (100a, 100b) modular.

What is claimed is:

1. A reinforcement member for a roof structure of a vehicle, the reinforcement member comprising:
   a first portion extending along a longitudinal axis of the vehicle, the first portion is defined with at least one protuberance, wherein the first portion is defined with a stepped section and is defined along an entire length of the first portion,
   wherein a profile of the at least one protuberance is a hat-shaped profile;
   a second portion angularly connected to the first portion and extending in a substantially perpendicular direction to the first portion, wherein the second portion is defined with one or more indentations.

2. The reinforcement member as claimed in claim 1, wherein the first portion and the second portion are integrally formed as a substantially L-shaped member.

3. The reinforcement member as claimed in claim 1, wherein the at least one protuberance is defined at a substantially central portion of the first portion.

4. The reinforcement member as claimed in claim 3, wherein the at least one protuberance is defined proximal to a periphery of the first portion.

5. The reinforcement member as claimed in claim 1, wherein a part of the second portion is defined with a stepped section.

6. A rear reinforcement member for a roof structure of a vehicle, the rear reinforcement member comprising:
   a first portion extending along a longitudinal axis of the vehicle and is defined with at least one protuberance, wherein the first portion is defined with a stepped section and is defined along an entire length of the first portion,
   wherein a profile of the at least one protuberance is a hat-shaped profile; and
   a second portion angularly connected to the first portion and extending in a substantially perpendicular direction to the first portion, wherein the second portion is defined with one or more indentations on an end opposite to an end of the second portion, the said first portion and the second portion is defined with a stepped section, the stepped section (102*b*) is defined along an entire length of the first portion and a part of the second portion.

7. The rear reinforcement member as claimed in claim 6, wherein the first portion is defined with a joggled section, wherein the joggled section is defined proximal to an end of the first portion, the joggled section is substantially perpendicular to the longitudinal axis.

\* \* \* \* \*